United States Patent Office 2,696,247
Patented Dec. 7, 1954

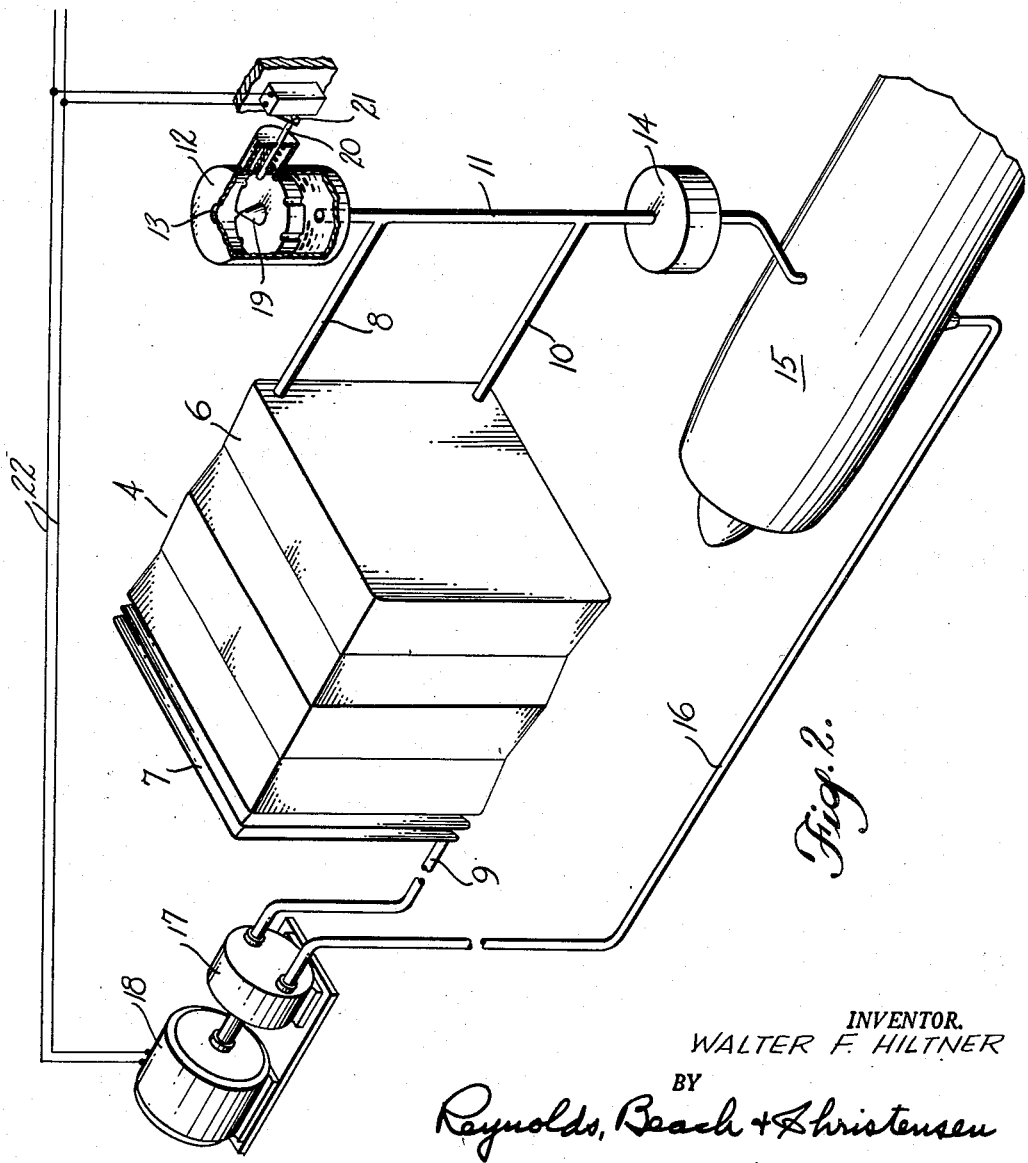

2,696,247

LIQUID FUEL RESERVOIR

Walter F. Hiltner, Seattle, Wash., assignor to Boeing Airplane Company, Seattle, Wash., a corporation of Delaware Application February 20, 1953, Serial No. 338,000

7 Claims. (Cl. 158—36.5)

The present invention deals with a subject that has concerned many prior inventors, namely, the provision of means to minimize loss of liquid fuel from the fuel tanks or reservoirs carried by airplanes, particularly military airplanes, in the event of damage by shell fragments or the like which cause rupture of the fuel tank or space, to the end that the tank will still retain and deliver sufficient fuel to enable the airplane to accomplish its mission, or at least to return safely to its base. The present invention concerns the reservoir and the system including the particular type of reservoir hereinafter disclosed and claimed, particularly in its relationship to the usual vent for the fuel system, and with relation to the means for producing sufficient pressure on the liquid fuel to deliver it from the reservoir to the engine.

The general object of the present invention is to provide an improved reservoir to the end indicated, and an improved system incorporating such a reservoir.

More specifically, the object of this invention is to provide an improved reservoir to the end indicated, particularly in that the entire reservoir space is occupied by a plurality of independent dual-chambered cells which are of such material that they will collapse unless filled, and of a volume with relation to the reservoir's volume such as will be explained more fully hereinafter; one of the chambers of each cell contains liquid fuel and the other receives a gas under slight pressure which will fill that gas chamber to the extent permitted by the volumetric relation of its liquid fuel chamber and the like chambers of other cells within the reservoir to the reservoir's total volume, whereby under normal conditions of use the gradual diminution of the liquid fuel supply is caused and accompanied by a gradual increase in the aggregate volume of the gas chambers, and whereby in the event of rupture of any liquid fuel chamber or chambers and loss of liquid fuel therefrom the gas chamber if unruptured, or the unruptured gas chambers of other cells, will immediately expand and take up the vacated volume, and thus will resume normal delivery from all unruptured liquid fuel chambers. The invention concerns also the improved fuel system incorporating such a reservoir.

In the accompanying drawings the invention is shown in a largely diagrammatic manner.

Figure 2 is a diagrammatic isometric view, partly broken away, showing the complete fuel and automatic control system.

Figure 1:
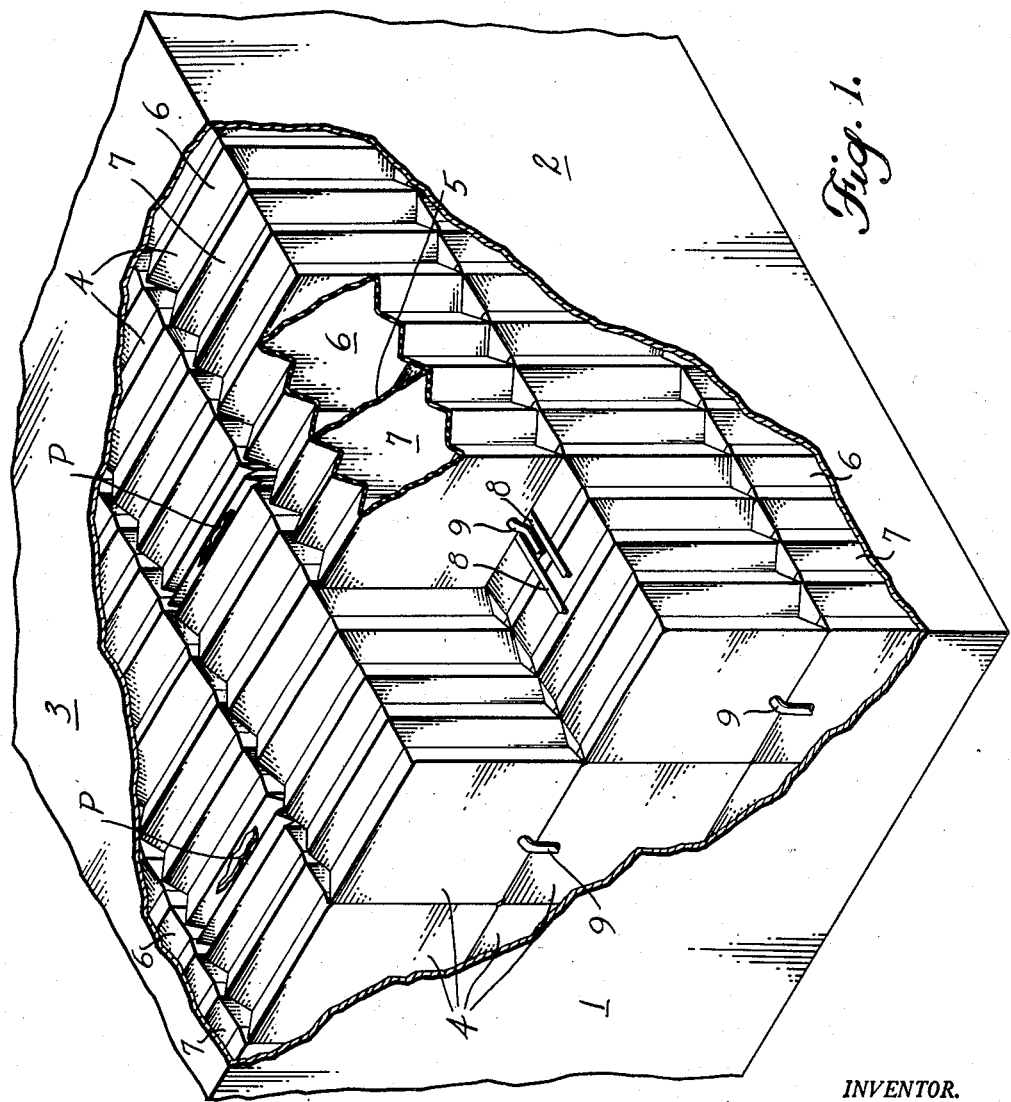
Figure 1 is a broken-away isometric view of such a reservoir, illustrating some cells partly filled with liquid fuel and partly filled with purge gas, and showing other cells which have been punctured, partly or wholly collapsed.

Liquid fuel may be carried upon an aircraft within a tank preconstructed and set into place within the aircraft structure, or the aircraft structure itself may have a portion enclosed and sealed to constitute a built-in fuel tank, as, for example, within the wing structure. The present invention is capable of use in either such type of tank, and so the reservoir is shown herein as formed of walls 1, 2 and 3, it being assumed that there are similar walls opposite to the three shown, to constitute a completely enclosed fuel space or reservoir, whatever its specific nature. That reservoir space is of fixed volume, and the several walls will produce a reacting force to contain hydrostatic or similar pressures internally developed.

The volume within the tank so formed is filled with a plurality of independent cells, generally designated by the numeral 4, each of which is formed of a flexible material which, however, is liquid-tight and gas-tight, but being formed of flexible material, the cell and its individual chambers are collapsible. It may have some stiffness in the vertical sense, since it is intended that the several cells be arranged in generally horizontal rows and in vertical tiers, row upon row, but only sufficient stiffness is needed to prevent their collapsing to the bottom of the reservoir space when completely empty, which they would seldom, if ever, be, as will appear shortly. Collapsibility of the individual cells 4 is indicated by the accordion folding best shown in Figure 1, but it is not essential that they be precisely and meticulously accordion-folded, as they may simply collapse as does a cloth sack.

Each cell is divided, along a horizontal and vertical plane when the cells are disposed in use, by a partition 5, so that each defines a liquid fuel chamber 6 and a purge gas chamber 7. In Figure 1, it has been attempted to distinguish exteriorly the liquid fuel chambers of the several cells by shading running in a given direction, from the purge gas chambers upon which the shading runs in a different direction.

Conduit means, as for example the individual conduits 8, extend from each liquid fuel chamber 6 to the exterior of the tank, and purge gas conduits 9 extend to each purge gas chamber 7 from the exterior. In Figure 2 only a single liquid conduit 8 is shown extending from the upper portion of a single cell 4, and a single purge gas conduit is shown at 9 extending from the purge gas chamber at the opposite end of that cell to a source of gas under slight pressure. For a reason which will appear, a secondary liquid conduit or drain is shown at 10, extending from the bottom of the liquid fuel chamber 6.

Enough such cells are located within each tank, and these cells have their chambers of such volume, that if all the liquid fuel chambers 6 are completely filled, all the purge gas chambers 7 will be empty and collapsed, and the volume of the liquid fuel within the several liquid fuel chambers 6 will be substantially equal to the volume of the tank. Likewise, with all the liquid fuel chambers 6 completely empty, and with purge gas filling all the purge gas chambers 7, the aggregate volume of the purge gas chambers will substantially equal the volume of the tank. In any intermediate position, for as much of the volume in a given cell as is occupied by purge gas filling the chamber 7, there will have been an equivalent discharge from its liquid fuel chamber 6 of the fuel from therewithin, and the liquid fuel chamber 6, though smaller than its initial volume, will still be completely filled with liquid fuel, and the corresponding purge gas chamber will be completely filled with purge gas under slight pressure, though of less volume than would be occupied by the gas if the liquid fuel chamber 6 of that cell were completely empty of liquid fuel. The combined volumes of chambers 6 and 7 will equal the initial volume of liquid fuel within the chamber 6, or the eventual volume of gas within the chamber 7.

In consequence of this condition, liquid fuel will always or normally flow from the liquid fuel conduit or outlet at 8, under the influence of the pressure of the purge gas, and/or the suction of the surge pump 14, but in case reliance must be placed on gravity, liquid fuel can still flow out of the drain conduit at 10. These two conduits are connected by a by-pass conduit 11, and the system as thus connected, together with the system from all other cells, connects to a vent chamber 12 provided with a vent port 13 for the liquid fuel system, as is customary. In similar fashion the system leads to the surge pump represented at 14, whereby fuel is supplied to the engine 15. Purge gas is taken from any suitable source. It may be atmospheric air, supplied under some pressure, or it may be exhaust gas from the engine by way of the conduit 16, led to a purge gas pump 17 driven by a motor 18, and so delivered by the conduits 9 to the several purge gas chambers.

In order to prevent loss of liquid fuel should the airplane become inverted, or should negative gravity tend to lift fuel out the vent port at 13, a valve 19 is provided, carried by a float, and this float may contact, as it moves toward position to close the vent 13, with a plunger 20, and through this or equivalent means may open a normally closed switch 21 in the circuit 22 to the motor at 18. When this switch at 21 is opened, the motor is deenergized and the surge pump 17 ceases to operate for so long as the switch 21 is held open by the movement of the valve 19 and its float from its normal position. Usually the arrangement would be such that upon parts assuming their normal positions, the switch 21 will be reclosed and operation of the motor 18 and surge pump 17 will recommence. The arrangement shown is intended only as diagrammatic, and any suitable means to the ends indicated may be employed.

It will be evident that each purge gas chamber 7 is under some pressure from the purge gas pump 17, and this pressure will serve to expand the volume of each purge gas chamber 7, and correspondingly to decrease the volume of the associated liquid fuel chamber 6, as the liquid fuel from the latter is discharged to the engine 15. If, however, the fuel chamber of any given cell should be punctured, as is indicated, for example, at P, and so lose liquid fuel through the puncture, the liquid fuel chamber 6 of that particular cell will empty itself of fuel, either through the puncture or through the drain at 10, and the volume thus lost will be compensated for by expansion of the purge gas chamber 7 of that and other cells within the same row, accompanied by such displacement lengthwise of the row as may be necessary for the individual cells, until the lost volume is completely compensated for, and so delivery continues from all unpunctured fuel chambers as before, and the loss is confined to those fuel chambers which are punctured. Should a purge gas chamber 7 be punctured, it will collapse, and the volume thereof will be made up by expansion of other purge gas chambers in the same row, until the entire volume within the reservoir is filled. Delivery of liquid fuel from the cell the gas chamber whereof was punctured is thus resumed by the aid of compensating expansion of other gas chambers.

No attempt has been made to include check valves, stop cocks, practical forms of controls, etc., since these would be recognized as needed in any event, and would be designed to fit each specific installation.

I claim as my invention:

1. A reservoir for liquid fuel upon an aircraft or the like, comprising an exterior housing defining a tank of fixed volume, and a multitude of dual-chambered cells, each collapsibly formed of flexible but liquid- and gas-tight material, with a partition, dividing each cell into two noncommunicating chambers, one for the reception of liquid fuel and the other for the reception of purge gas, liquid conduit means leading from each liquid fuel chamber, and gas conduit means leading to each purge gas chamber, the aggregate volume of the several liquid fuel chambers when full, and with their purge gas chambers empty and collapsed, being substantially equal to the tank's volume, whereby the several cells cooperate to fill the tank with liquid fuel within the separate cells, and the aggregate volume of the several purge gas chambers when full, and with their liquid fuel chambers empty and collapsed, being also substantially equal to the tank's volume, whereby the several cells cooperate to fill the tank with purge gas within the separate cells, and means to supply purge gas under pressure by way of said gas conduit means to the interiors of the several purge gas chambers, whereby the tank volume is fully occupied at all times during operation by cells wholly filled with liquid fuel, or partly with liquid fuel and partly with purge gas, or wholly with purge gas in the event of exhaustion of the liquid fuel supply, or of leakage developing in a given cell's liquid fuel chamber.

2. A reservoir as defined in claim 1, wherein the cells are disposed within the tank each with its partition disposed uprightly, and with the liquid fuel chamber of each cell alongside its purge gas chamber.

3. A reservoir as defined in claim 1, wherein the gas conduit is in free communication at all times during operation with all the purge gas chambers.

4. A reservoir as defined in claim 1, wherein the cells are disposed in generally horizontal rows, in vertical tiers, in free contact with all adjoining cells.

5. A reservoir as defined in claim 1, wherein the liquid conduit means leads from the upper portion of the several liquid fuel chambers, a liquid drainage conduit leading from the lower portion of each liquid fuel chamber, a by-pass conduit connecting the two liquid conduits, and a vent leading from the connected conduit system.

6. A liquid fuel supply combination as defined in claim 5, including a gravity valve to close said vent upon inversion of or reverse gravity effect upon the combination.

7. A liquid fuel supply combination as defined in claim 6, including a purge gas pump, a normally inoperative shut-off means for said pump, located in the path of movement of said valve, and engageable by movement of the valve to closed position to shut off said pump.

References Cited in the file of this patent

UNITED STATES PATENTS

| Number | Name | Date |
|--------|------|------|
| 2,394,852 | Goddard | Feb. 12, 1946 |